Oct. 24, 1967   L. M. HUDSON   3,348,901

FIVE COMPONENT OBJECTIVE LENS

Filed June 18, 1964

LENA M. HUDSON
INVENTOR.

BY Frank C. Parker

ATTORNEYS

United States Patent Office 3,348,901
Patented Oct. 24, 1967

3,348,901
FIVE COMPONENT OBJECTIVE LENS
Lena M. Hudson, Brighton, N.Y., assignor to Bausch & Lomb Incorporated, Rochester, N.Y., a corporation of New York
Filed June 18, 1964, Ser. No. 376,007
2 Claims. (Cl. 350—210)

ABSTRACT OF THE DISCLOSURE

A photographic objective lens for cameras and the like having a comparatively large field of view of at least 31°, the astigmatism, curvature of field, and lateral color being corrected for the full field and additionally the spherical and chromatic aberrations as well as coma are very well corrected for the axial rays.

---

This invention relates to improved objective lenses of the type having five elements and more particularly to a wide aperture photographic objective.

The prior art lenses for wide aperture 8 mm. cameras normally comprise a four element system. The design of such lenses is usually based on a modified triplet lens wherein one of the three lenses is split into two elements to thereby provide a four element system. The five lens systems according to the present invention are also based on a modified triplet, however the two positive lenses are each split into two parts to thereby provide a five element system having improved optical characteristics.

The lenses disclosed and claimed herein are particularly adaptable for use on 8 mm. cameras which have a relatively large field of view. Advantageously, the astigmatism, curvature of field and lateral color are fully corrected for an angle of 15.5° to thereby provide a full field of 31°. In addition to having well corrected rim rays, the spherical aberration, coma and chromatic aberration on the axis are well corrected.

The lenses according to this invention are constructed in a manner which should result in additional commercial advantages. For example, the competitive nature of the lens business makes it highly desirable to produce lenses of superior optical performance while maintaining or reducing the manufacturing costs thereof. The present lenses have improved optical characteristics as set forth in the preceding paragraph, and also comprise a structure which facilitates manufacturing procedures to thereby reduce the overall cost of the finished lens assemblies. For example each of the lenses is airspaced to thereby eliminate any costs associated with cementing lenses to one another. Additionally, all of the curves used throughout the system are sufficiently flat so that the manufacturing of the individual components is relatively inexpensive. Furthermore, the glasses used are for the most part readily available and relatively inexpensive.

Briefly, the lenses according to the present invention include five elements. The first two elements are positive, the third negative, while the fourth and fifth elements are positive. The first three elements form the front of the system and are separated from the last two elements by a diaphragm D, the axial position of which is indicated by X. The first component is a meniscus lens having its two radii concave to the diaphragm. The second component is a double convex lens having its shorter curve on the front side, i.e. on the long conjugate side. The third element is a double concave lens having both curves alike. The latter feature makes it particularly easy to manufacture and mount. The fourth element is a meniscus lens wherein the curves are concave toward the diaphragm.

The fifth or last lens is a double convex lens with the strong curve on the outside or facing the back of the lens. The elements according to the present invention also conform to the data set forth in Table A wherein $F_I$ to $F_V$ designate the focal lengths of the successive lenses I to V and the minus (—) sign means negative focal length, $t_1$ to $t_5$ designate the axial thicknesses of the successive lenses, $S_1$ to $S_5$ designate the successive interlens axial airspaces, $S_3$ and $S_4$ being the front and rear airspaces respectfully lying between the confronting concave surface $R_6$ and $-R_7$ on opposite sides of the plane of the diaphragm D which is indicated by X on the axis.

TABLE A $3.3827F < F_I < 4.1345F$
$0.9899F < F_{II} < 1.2097F$
$0.4990F < F_{III} < 0.6100F$
$1.0095F < F_{IV} < 1.2339F$
$1.3843F < F_V < 1.6916F$
$.0708F < t_1 < 0.0866F$
$0.1204F < t_2 < 0.1472F$
$0.0808F < t_3 < 0.0988F$
$0.1134F < t_4 < 0.1386F$
$0.0850F < t_5 < 0.1040F$
$0.0071F < S_1 < 0.0087F$
$0.1255F < S_2 < 0.1533F$
$0.0850F < S_3 < 0.1040F$
$0.0397F < S_4 < 0.0485F$
$0.0014F < S_5 < 0.0018F$

The above features provides a final product that is well corrected for spherical aberration, coma, chromatic aberration, astigmatism curvature and distortion.

The lenses are well corrected and readily adaptable for use with wide angle and telephoto attachments that are frequently used in 8 mm. photography.

The lenses according to the presently preferred embodiment of the invention also conform substantially to the condition set forth in Table B.

TABLE B $1.6520 < n_1 < 1.6620$
$1.6520 < n_2 < 1.6620$
$1.7150 < n_3 < 1.7250$
$1.6520 < n_4 < 1.6620$
$1.6150 < n_5 < 1.6250$
$50.4 < \nu_1 < 51.4$
$50.4 < \nu_2 < 51.4$
$28.8 < \nu_3 < 29.8$
$56.7 < \nu_4 < 57.7$
$59.8 < \nu_5 < 60.8$ wherein $n_1$ through $n_5$ are the indices of refraction for the glass for the yellow spectral line of helium light for the elements I through V respectively, and in connection with their color dispersion, their numerical value of their respective Abbe numbers are designated by $\nu_1$ through $\nu_5$ respectively.

The invention will now be described by reference to the accompanying drawings; in which, FIG. 1 is an axial section through an objective system embodying the present invention;

In the figure the long conjugate side of the lens is at the bottom of the figure.

The distinguishing features of the present invention are achieved by a novel distribution of focal lengths or radii and the thicknesses and spacings of the elements set forth herein. For example, the relationship of the radii to the equivalent focal length F of the system is shown in Table C.

TABLE C $1.3153F < R_1 < 1.6075F$
$3.1535F < R_2 < 3.8643F$
$0.7108 < R_3 < 0.8688F$
$7.1291F < -R_4 < 8.7133F$
$0.7352F < -R_5 < 0.8986F$
$0.7352F < R_6 < 0.8986F$
$8.1000F < -R_7 < 9.9000F$
$0.6175F < -R_8 < 0.7535F$
$1.9708F < R_9 < 2.4088F$
$1.5053F < -R_{10} < 1.8275F$ wherein $R_1$ to $-R_{10}$ designate the radii of the successive lens surfaces of the lenses I to V, the minus (—) sign meaning that the designated surface is concave toward the front of the objective.

The presently preferred form of the invention also conforms to the following constructional data shown in Table D.

TABLE D $R_1 = 1.4614F$
$R_2 = 3.5039F$
$R_3 = .7898F$
$-R_4 = 7.9212F$
$-R_5 = 0.8169F$
$R_6 = 0.8169F$
$R_7 = 9.000F$
$-R_8 = 0.6850F$
$R_9 = 2.1898F$
$-R_{10} = 1.6614F$
$t_1 = 0.0787F$
$t_2 = 0.1338F$
$t_3 = 0.0898F$
$t_4 = 0.1260F$
$t_5 = 0.0945F$
$S_1 = 0.0079F$
$S_2 = 0.1394F$
$S_3 = 0.0945F$
$S_4 = 0.0441F$
$S_5 = 0.0016F$
$n_1 = 1.6570$
$n_2 = 1.6570$
$n_3 = 1.7200$
$n_4 = 1.6570$
$n_5 = 1.6200$
$\nu_1 = 50.9$
$\nu_2 = 50.9$
$\nu_3 = 29.3$
$\nu_4 = 57.2$
$\nu_5 = 60.3$

Figure 1:
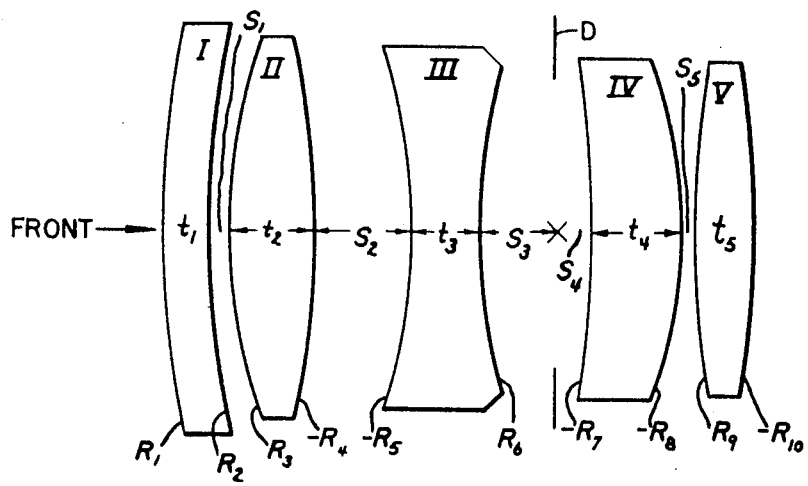
Figure 2:
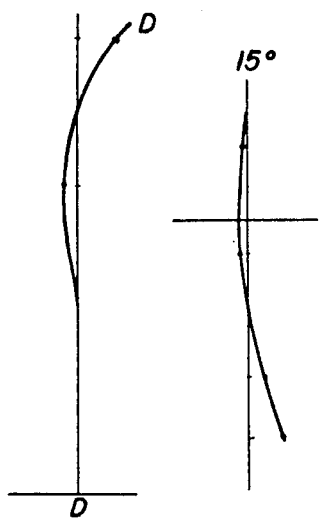
FIG. 2 is a graph showing the spherical aberration of the lens shown in FIG. 1.
Figures 3, 4:
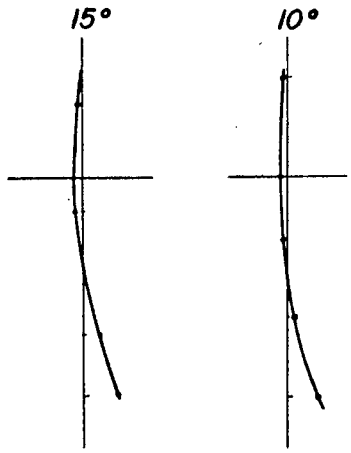
FIG. 3 is a graph showing the coma aberrations over 15° of the lenses according to one embodiment of the present invention.
FIG. 4 is a graph showing the coma aberrations over 10° of the lens according to the present invention; and, FIG. 5 is a graph showing the astigmatism of a lens according to the present invention.
Figure 5:
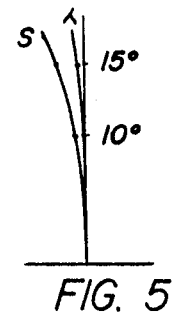

The lenses disclosed herein are particularly well corrected for spherical aberrations, coma, chromatic aberration astigmatism curvature and distortion as illustrated in FIGS. 2 through 5. The well corrected lenses are also compatible with the wide angle and telephoto attachments which are frequently used in 8 mm. photography.

The costs associated with the manufacturing of the lenses according to the present invention have also been substantially reduced. For example, the lenses are airspaced from each other so that there is no expense associated with cementing a plurality of elements to form a complex lens. Additionally, the selection of glasses for the individual elements has further reduced the costs of the lens system.

The curves throughout the system are moderate which facilitates the manufacturing of the lens. The third lens also has its two curves alike so that it is particularly easy to manufacture and mount in the assembly.

The structural data set forth in Table C leads to the objective form set forth in the following Table E wherein the equivalent focal length of the system is 100 units.

TABLE E

| Lens | Radius | Thickness or Spacing |
|---|---|---|
| I | $1.3153F < R_1 < 1.6075F$ <br> $3.1535F < R_2 < 3.8643F$ | $0.0708F < t_1 < 0.0866F$ <br> $0.0071F < S_1 < 0.0087F$ |
| II | $0.7108F < R_3 < 0.8688F$ <br> $7.1291F < -R_4 < 8.7133F$ | $0.1204F < t_2 < 0.1472F$ <br> $0.1253F < S_2 < 0.1533F$ |
| III | $0.7352F < -R_5 < 0.8986F$ <br> $0.7352F < R_6 < 0.8968F$ | $0.0808F < t_3 < 0.0988F$ <br> $0.0850F < S_3 < 0.1040F$ <br> $0.0397F < S_4 < 0.0485F$ |
| IV | $8.1000F < -R_7 < 9.9000F$ <br> $0.6175F < -R_8 < 0.7535F$ | $0.1134F < t_4 < 0.1386F$ <br> $0.0014F < S_5 < 0.0018F$ |
| V | $1.9708F < R_9 < 2.4088F$ <br> $1.5053F < -R_{10} < 1.8275F$ | $0.0850F < t_5 < 0.1040F$ |

INDEX OF REFRACTION $1.6520 < n_1 < 1.6620$
$1.6520 < n_2 < 1.6620$
$1.7150 < n_3 < 1.7250$
$1.6520 < n_4 < 1.6620$
$1.6150 < n_5 < 1.6250$
$50.4 < \nu_1 < 51.4$
$50.4 < \nu_2 < 51.4$
$28.8 < \nu_3 < 29.8$
$56.7 < \nu_4 < 57.7$
$59.8 < \nu_5 < 60.8$

The complete data for the lens system according to the presently preferred embodiment of the invention is set forth in the accompanying Table F for a lens of equivalent focal length F = 100.0 mm.

TABLE F

E.F.L. = 100    BF = 68.51    field = 31°    f/1.8

| Element | Radius | Thickness or spacing | Index of refraction | Abbe number |
|---|---|---|---|---|
| I | $R_1 = 146.14$ <br> $R_2 = 350.39$ | $t_1 = 7.87$ <br> $S_1 = 0.79$ | $n_1 = 1.6570$ | $\nu_1 = 50.9$ |
| II | $R_3 = 78.98$ <br> $-R_4 = -792.12$ | $t_2 = 13.38$ <br> $S_2 = 13.94$ | $n_2 = 1.6570$ | $\nu_2 = 50.9$ |
| III | $-R_5 = -81.69$ <br> $R_6 = 81.69$ | $t_3 = 8.98$ <br> $S_3 = 9.45$ <br> $S_4 = 4.41$ | $n_3 = 1.7200$ | $\nu_3 = 29.3$ |
| IV | $-R_7 = -900.00$ <br> $-R_8 = -68.50$ | $t_4 = 12.60$ <br> $S_5 = 0.16$ | $n_4 = 1.6570$ | $\nu_4 = 57.2$ |
| V | $R_9 = 218.98$ <br> $R_{10} = -166.14$ | $t_5 = 9.45$ | $n_5 = 1.6200$ | $\nu_5 = 60.3$ | wherein $R_1$ to $R_{10}$ are the radii of the lens surfaces, $t_1$ to $t_5$ are the axial thicknesses, $S_1$ to $S_5$ are the axial spacings, $n_1$ to $n_5$ are the indices of refraction, and $\nu_1$ to $\nu_5$ are the Abbe numbers of the elements I–V respectively. All dimensions in Table F are scalar quantities except $n_1$ to $n_5$ and $\nu_1$ to $\nu_5$.

While the invention has been described hereinabove in terms of an example which embodies it, the scope of the invention itself is set forth in the accompanying claims.

What is claimed is:

1. An objective lens comprising a positive meniscus lens having the two radii facing the rear of the system, a double convex positive lens having its shorter curve on the long conjugate side of the system, and a double concave negative lens; a fourth element comprising a positive meniscus lens and a diaphragm separating the fourth element from the third lens, the radii of the fourth element defining curves which are concave toward the diaphragm, and a fifth element defining a double convex positive lens having its strong curve facing the back of the lens, said lenses conforming substantially to the following conditions:

$$R_1 = 1.4614F$$
$$R_2 = 3.5039F$$
$$R_3 = .7898F$$
$$-R_4 = 7.9212F$$
$$-R_5 = 0.8169F$$
$$R_6 = 0.8169F$$
$$-R_7 = 9.0000F$$
$$-R_8 = 0.6850F$$
$$R_9 = 2.1898F$$
$$-R_{10} = 1.6614F$$
$$t_1 = 0.0787F$$
$$t_2 = 0.1338F$$
$$t_3 = 0.0898F$$
$$t_4 = 0.1260F$$
$$t_5 = 0.0945F$$
$$S_1 = 0.0079F$$
$$S_2 = 0.1394F$$
$$S_3 = 0.0945F$$
$$S_4 = 0.0441F$$
$$S_5 = 0.0016F$$
$$n_1 = 1.6570$$
$$n_2 = 1.6570$$
$$n_3 = 1.7200$$
$$n_4 = 1.6570$$
$$n_5 = 1.6200$$
$$\nu_1 = 50.9$$
$$\nu_2 = 50.9$$
$$\nu_3 = 29.3$$
$$\nu_4 = 57.2$$
$$\nu_5 = 60.3$$

wherein F is the equivalent focal length of the system, $R_1$ through $R_{10}$ are the radii of the surfaces of the elements I through V respectively, the minus (—) sign meaning that the designated surface is concave toward the front of the objective, $t_1$ through $t_5$ are the axial thicknesses of the elements I–V respectively and $S_1$ through $S_5$ are the axial interlens spacings, $S_3$ and $S_4$ being the front and rear airspaces lying between the concave surfaces $R_6$ and $-R_7$ respectively and the axial position of the diaphragm and wherein $n_1$ through $n_5$ and $\nu_1$ through $\nu_5$ are the index of refraction and the Abbe numbers of the respective elements I–V.

2. An objective lens comprising a positive meniscus lens having the two radii facing the rear of the system, a double convex positive lens having its shorter curve on the long conjugate side of the system, and a double concave negative lens; a fourth element comprising a positive meniscus lens and a diaphragm separating the fourth element from the third lens, the radii of the fourth element defining curves which face the diaphragm, and a fifth element defining a double convex positive lens having its strong curve facing the back of the lens, said lenses conforming substantially to the following conditions:

TABLE F

E.F.L. = 100   BF = 68.51   field = 31°   f/1.8

| Element | Radius | Thickness or spacing | Index of refraction | Abbe number |
|---|---|---|---|---|
| I | $R_1 = 146.14$ | $t_1 = 7.87$ | $n_1 = 1.6570$ | $\nu_1 = 50.9$ |
|  | $R_2 = 350.39$ | $S_1 = 0.79$ |  |  |
| II | $R_3 = 78.98$ | $t_2 = 13.38$ | $n_2 = 1.6570$ | $\nu_2 = 50.9$ |
|  | $-R_4 = -792.12$ | $S_2 = 13.94$ |  |  |
| III | $-R_5 = -81.69$ | $t_3 = 8.98$ | $n_3 = 1.7200$ | $\nu_3 = 29.3$ |
|  | $R_6 = 81.69$ | $S_3 = 9.45$ |  |  |
|  |  | $S_4 = 4.41$ |  |  |
| IV | $-R_7 = -900.00$ | $t_4 = 12.60$ | $n_4 = 1.6570$ | $\nu_4 = 57.2$ |
|  | $-R_8 = -68.50$ | $S_5 = 0.16$ |  |  |
| V | $R_9 = 218.98$ | $t_5 = 9.45$ | $n_5 = 1.6200$ | $\nu_5 = 60.3$ |
|  | $R_{10} = -166.14$ |  |  |  | wherein $R_1$ to $R_{10}$ are the radii of the lens surfaces and the minus (—) sign means that the designated surface is concave toward the front, $t_1$ to $t_5$ are the axial thicknesses, $S_1$ to $S_5$ are the axial spacings $S_3$ and $S_4$ being the front and rear airspaces lying between the concave surfaces $R_6$ and $-R_7$ respectively and the axial position of the diaphragm, $n_1$ to $n_5$ are the indices of the refraction and $\nu_1$ to $\nu_5$ are the Abbe numbers of the optical materials used in said elements I–V respectively, the numerical values being scalar values in the table.

No references cited.

JEWELL H. PEDERSEN, *Primary Examiner.*

R. J. STERN, *Assistant Examiner.*